No. 707,712. Patented Aug. 26, 1902.
J. W. NETHERY.
FLOW REDUCING DEVICE.
(Application filed Dec. 18, 1901.)
(No Model.)

WITNESSES:
C. S. Frye
A. S. Gearing

INVENTOR.
Joseph W. Nethery,
BY Chester Bradford,
ATTORNEY.

THE NORRIS PETERS CO., PHOTO-LITHO., WASHINGTON, D. C.

UNITED STATES PATENT OFFICE.

JOSEPH W. NETHERY, OF INDIANAPOLIS, INDIANA, ASSIGNOR TO THE NETHERY HYDRAULIC VALVE COMPANY, OF INDIANAPOLIS, INDIANA, NEW YORK, N. Y., AND JERSEY CITY, NEW JERSEY, A CORPORATION OF NEW JERSEY.

FLOW-REDUCING DEVICE.

SPECIFICATION forming part of Letters Patent No. 707,712, dated August 26, 1902.

Application filed December 18, 1901. Serial No. 86,373. (No model.)

*To all whom it may concern:*

Be it known that I, JOSEPH W. NETHERY, a citizen of the United States, residing at Indianapolis, in the county of Marion and State of Indiana, have invented certain new and useful Improvements in Flow-Reducing Devices, of which the following is a specification.

The object of my said invention is to produce a device by means of which the quantity of fluid capable of passing through the same may be regulated, irrespective of the pressure in the pipes behind said device, so that the discharging pressure at all points in any fluid-distribution system may be made the same, irrespective of the height at which the branch or opening is taken therefrom. This invention is especially adapted for use in tall buildings, where the water-pressure varies on the various floors, it being necessarily much greater on the lower floors than it is on the upper floors, nearer the tank, where it originates.

Said invention consists in a conical tube adapted to be secured within the pipe and constructed so that its smaller end, which points in the direction from which the flow of fluid comes, can be quickly and easily made of the size necessary to secure the proper pressure beyond said device during the time fluid is passing through the same, as will be hereinafter more particularly described and claimed.

Figure 1:
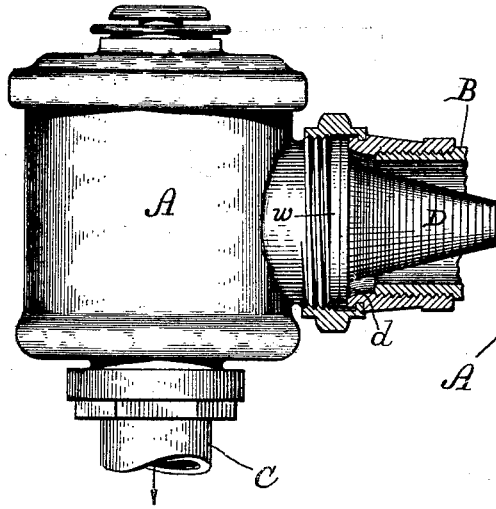
Figure 2:
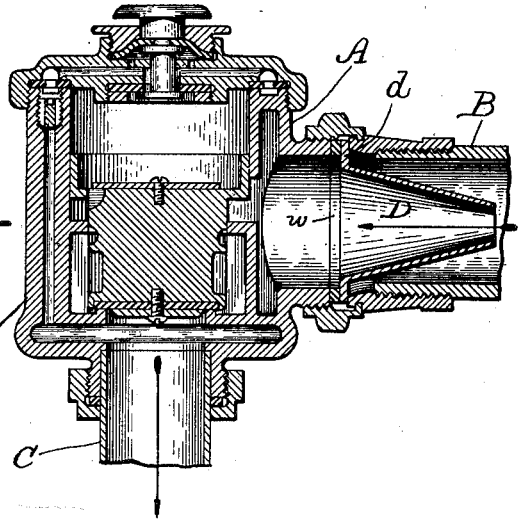
Figure 3:
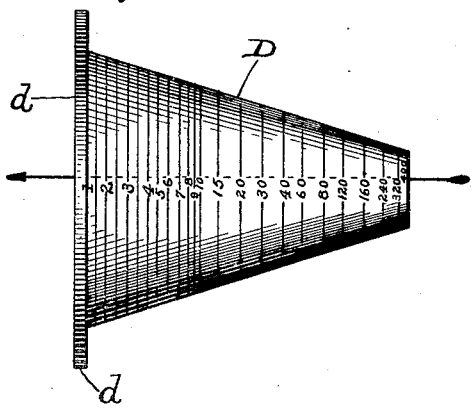
Figure 4:
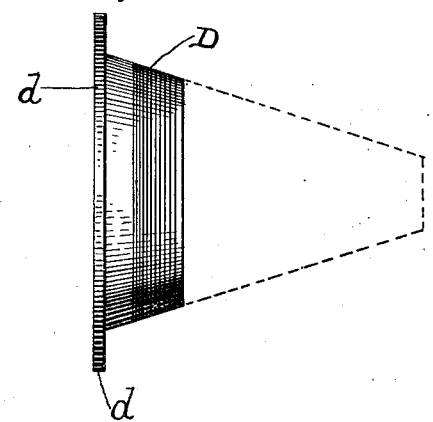

Referring to the accompanying drawings, which are made a part hereof, and on which similar reference characters indicate similar parts, Figure 1 is a view of a fragment of a fluid-distribution system, including a valve and fragments of the pipes connected thereto, so much being shown in section as exhibits the flow-reducing device, which is the leading feature of my invention; Fig. 2, a central sectional view of the same parts shown in Fig. 1; Fig. 3, a side elevation, on an enlarged scale, showing my flow-reducing device separately; and Fig. 4, a view similar to Fig. 3, but showing a portion of said device cut away and the device thus adapted for use with a lower pressure, the cut-away portion being indicated by dotted lines.

In said drawings the portions marked A represent a suitable valve for use in a fluid-distribution system; B, the ingress-pipe thereto; C, the egress-pipe; and D, the pressure or flow-reducing device, which is a feature of my present invention.

I have illustrated this invention in connection with an automatically-acting valve; but it should be understood that it is capable of and designed for use in any suitably constructed or arranged fluid-distribution system, either in connection with valves or otherwise, as may be desired. The valve and pipes may, therefore, be of any desired construction and arrangement, and are shown merely to illustrate one situation in which my invention may be advantageously used.

The flow-reducing device D consists, as before stated, of a conical tube adapted to be inserted within a pipe, its smaller end extending in the direction from which the flow comes. It should have a suitable flange $d$, by means of which it is conveniently adapted to be secured within a union or pipe coupling. I also prefer to use a leather or other compressible washer $w$ for the purpose of conveniently making the joint within which it is secured fluid-tight. Upon the surface of the part D, I form a series of graduated score-marks, and in connection with each of said score-marks I place a numeral indicating either the pressure or the height of the water-column, as may be desired appropriate to an opening of the size provided when the part D is cut off at that point. In the drawings, Fig. 3, I have shown score-marks, indicating variations from one to four hundred pounds, and in Fig. 4 I have shown the device cut off at the point suitable for use under the conditions illustrated at a pressure of about six pounds. In applying my invention to practical use in a building, say, of ten stories, these devices would be cut off at ten different points, so that when water was flowing through the fixtures the pressure at the delivery-point would be the same on all the stories irrespective of the variation of pressure in the pipes due to the different heights of water-column to the various points of distribution, it being only necessary to know the height of the distribution-point and the fluid-pressure at such height to determine the point at which the device should be cut off to adapt it for use thereat.

An important feature is the arrangement of this device with its smaller end toward the direction from which the flow comes. This entirely overcomes any tendency to "whistling" on the part of the fluid as it passes through the device, which is a very objectionable feature of constructions where fluid is merely caused to pass through a constricted opening. In this device the enlargement of space for the fluid beyond the ingress-opening therein is regular and gradual, and the result is that the flow is noiseless.

Having thus fully described my said invention, what I claim as new, and desire to secure by Letters Patent, is—

1. The combination, with the pipes of a fluid-distribution system, of a flow-reducing device consisting of a conical tube secured within such pipe and arranged with its smaller end pointing toward the direction from which the flow comes, substantially as set forth.

2. A flow-reducing device adapted to be secured within the pipe of a fluid-distribution system, consisting of a conical tube provided with graduation-marks indicating pressure quantity, and adapted to be cut off at such score-marks and thereby adapted to be used at the pressure indicated, substantially as set forth.

3. The combination, in a fluid-distribution system, with the pipes thereof, of a flow-reducing device consisting of a conical tube adapted to be placed within said pipe, said device being provided with a flange whereby it may be secured at the union or pipe coupling, substantially as set forth.

In witness whereof I have hereunto set my hand and seal at Indianapolis, Indiana, this 5th day of December, A. D. 1901.

JOSEPH W. NETHERY. [L. S.]

Witnesses:
CHESTER BRADFORD,
ALBERT F. ZEARING.